United States Patent

Ruland

[11] Patent Number: 5,649,451
[45] Date of Patent: Jul. 22, 1997

[54] COMPACT MECHANISM FOR CREATING SIMULTANEOUS ROTARY AND LINEAR MOTION

[76] Inventor: Frederick W. Ruland, 929 Massachusetts Ave., Cambridge, Mass. 02139

[21] Appl. No.: 269,160

[22] Filed: Jun. 30, 1994

[51] Int. Cl.⁶ .................................................. F16H 1/08
[52] U.S. Cl. .......................... 74/424.8 B; 74/424.8 R
[58] Field of Search ................. 74/424.8 B, 424.8 R; 310/80

[56] References Cited

U.S. PATENT DOCUMENTS

| | | |
|---|---|---|
| 2,023,841 | 12/1935 | Kingsbury . |
| 2,476,584 | 7/1949 | Clark ........................... 74/424.8 B |
| 2,860,266 | 11/1958 | Schrader . |
| 3,407,680 | 10/1968 | Westmoreland . |
| 3,872,738 | 3/1975 | Price et al. ..................... 74/424.8 B |
| 4,123,192 | 10/1978 | Ruland . |
| 4,494,025 | 1/1985 | Fickler . |
| 4,872,362 | 10/1989 | Kemper et al. . |
| 4,926,709 | 5/1990 | Gardner ........................ 74/424.8 B |
| 4,939,946 | 7/1990 | Teramachi ........................ 74/89.15 |
| 5,127,281 | 7/1992 | Yanawgisawa ................... 74/89.15 |
| 5,203,222 | 4/1993 | Hirai . |
| 5,327,795 | 7/1994 | Katahira ....................... 74/424.8 B |

FOREIGN PATENT DOCUMENTS

PCT/CH85/ 00112 7/1985 WIPO ........................ 74/424.8 B

*Primary Examiner*—Rodney H. Bonck
*Assistant Examiner*—David Fenstermacher
*Attorney, Agent, or Firm*—Lappin & Kusmer LLP

[57] ABSTRACT

A compact mechanism for producing simultaneous rotary and linear motion for a machine tool includes a drive shaft having a spline race and helical race coextensive over at least a portion of its length. The compact mechanism includes a first motor coupled to a screw engaging the helical race for imparting linear motion on the drive shaft. The compact mechanism also includes a second motor coupled to a spline engaging the spline race for imparting rotary motion on the drive shaft. By operating the motors simultaneously but independently, a wide range of linear movement is obtained.

18 Claims, 6 Drawing Sheets

COMPACT MECHANISM FOR CREATING SIMULTANEOUS ROTARY AND LINEAR MOTION

BACKGROUND OF THE INVENTION

This invention relates to machine tools and more particularly, compact components for machine tools which create simultaneous linear and rotary movement of tools or workpieces.

A typical machining operation, such as drilling or tapping, requires that a cutting tool, such as a drill or tap, be rotated at a predetermined speed and advanced at a predetermined feed rate toward the workpiece in order to perform the machining operation. In conventional production environments, it is desirable to perform the operation as quickly as possible to minimize idle time and reduce costs. Consequently, it is important that the tool approach the workpiece at as high a feed rate as possible until just prior to contact with the workpiece and after the operation is completed, that the tool retract from the workpiece at as high a feed rate as possible. During machining, the rotational speed and feed rate of the tool are chosen to achieve optimal cutting performance and minimal tool wear. Unfortunately, conventional machine tools generally do not have a wide dynamic range of feed rates which are effective to reduce approach and retract times and thus minimize idle time.

Conventional machine tools typically include an electric, hydraulic or pneumatic motor which is connected, either directly or by gears or belts, to a drive shaft to produce rotary motion. The drive shaft, the motor and any intervening transmission is then coupled to a pneumatic or hydraulic cylinder or other linear actuator to provide the linear motion necessary for the desired feed rates. A chuck or other tool holding device can be coupled to the drive shaft for mounting a tool or workpiece.

Other prior art devices, such as U.S. Pat. No. 3,407,680 to Westmoreland, utilize two motors and a drive shaft to produce linear motion. One motor drives a ball screw engaging a helical race on one portion of the drive shaft to produce linear motion. The second motor drives a ball spline engaging a spline on a separate portion of the drive shaft to increase the rational speed of the shaft, with the net effect to increase the dynamic range of linear motion of the shaft. The end of the drive shaft is typically fitted with a device which transmits linear motion but does not transmit the rotary motion of the shaft. Because the helical race and the spline are on separate portions of the drive shaft, these devices are not compact and have a limited range of linear motion.

One of the significant disadvantages of the prior art devices is that they are large and bulky. Because of their size, they require a large supporting frame, they are difficult to manipulate during use and they limit the size of tools and workpieces that can be used. In addition, the prior art devices are mechanically and electrically complex, therefore have poor reliability and are difficult to maintain and repair. In addition, attempts to produce compact, light weight designs have resulted in devices that are less accurate and have a limited range of rotational speeds and feed rates.

Accordingly, it is an object of this invention to provide an improved mechanism for creating simultaneous rotary and linear motion.

It is another object of the invention to provide a compact mechanism for creating simultaneous rotary and linear motion.

It is yet another object of the invention to provide an improved mechanism for creating simultaneous rotary and linear motion which has a greater dynamic range of rotational speeds and feed rates.

SUMMARY OF THE INVENTION

The foregoing objects are accomplished in accordance with the present invention by providing a first drive motor for imparting a linear motion to an output shaft and a second drive motor for imparting a rotary motion to the output shaft. The output shaft can include a chuck or other tool holding device. A controller can also be provided to independently control the speeds to the motors and thus control rotational speed and linear feed of the shaft.

In one embodiment, the first drive motor includes a rotor and a stator. The stator of the first motor is coupled to the stator of the second drive motor and can include a mounting element for mounting the device on a machine tool as a drilling or tapping unit or a gripping element for holding a workpiece. The rotor is coupled to a first transmitting element which converts the rotary motion of the rotor to linear motion and imparts that linear motion to the output shaft while permitting the shaft to rotate.

The second drive motor also includes a rotor and a Stator. The stator of the second motor is coupled to the stator of the first drive motor. The rotor is coupled to the second transmitting element which imparts rotary motion to the output shaft while permitting the shaft to move axially.

In another embodiment, the first drive motor includes a rotor and a stator. The rotor of the first motor is coupled to a first transmitting element which converts the rotary motion of the rotor to linear motion and imparts that linear motion to the output shaft. The output shaft can include a mounting or gripping element for holding a tool or workpiece. The stator of the first motor is coupled to the rotor of a second drive motor and a second transmitting element.

The second drive motor also includes a rotor and a stator. The stator can include a mounting element for mounting the device on a machine tool. The rotor of the second motor is coupled to the stator of the first drive motor and the second transmitting element. The second transmitting element imparts rotary motion to the output shaft while permitting the shaft to move axially.

In the second embodiment, the first drive motor is rotated by the second drive motor and therefore brushes or slip rings can be utilized to provide power and control signals to the motor.

In either embodiment, the output shaft can include at least a portion which can be engaged by both the first transmitting element and the second transmitting element and therefore permits more linear travel of the output shaft per unit length of the device. This results in a simple and compact mechanism for producing both simultaneous linear and rotary motion.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE PREFERRED EMBODIMENTS

Figure 1:
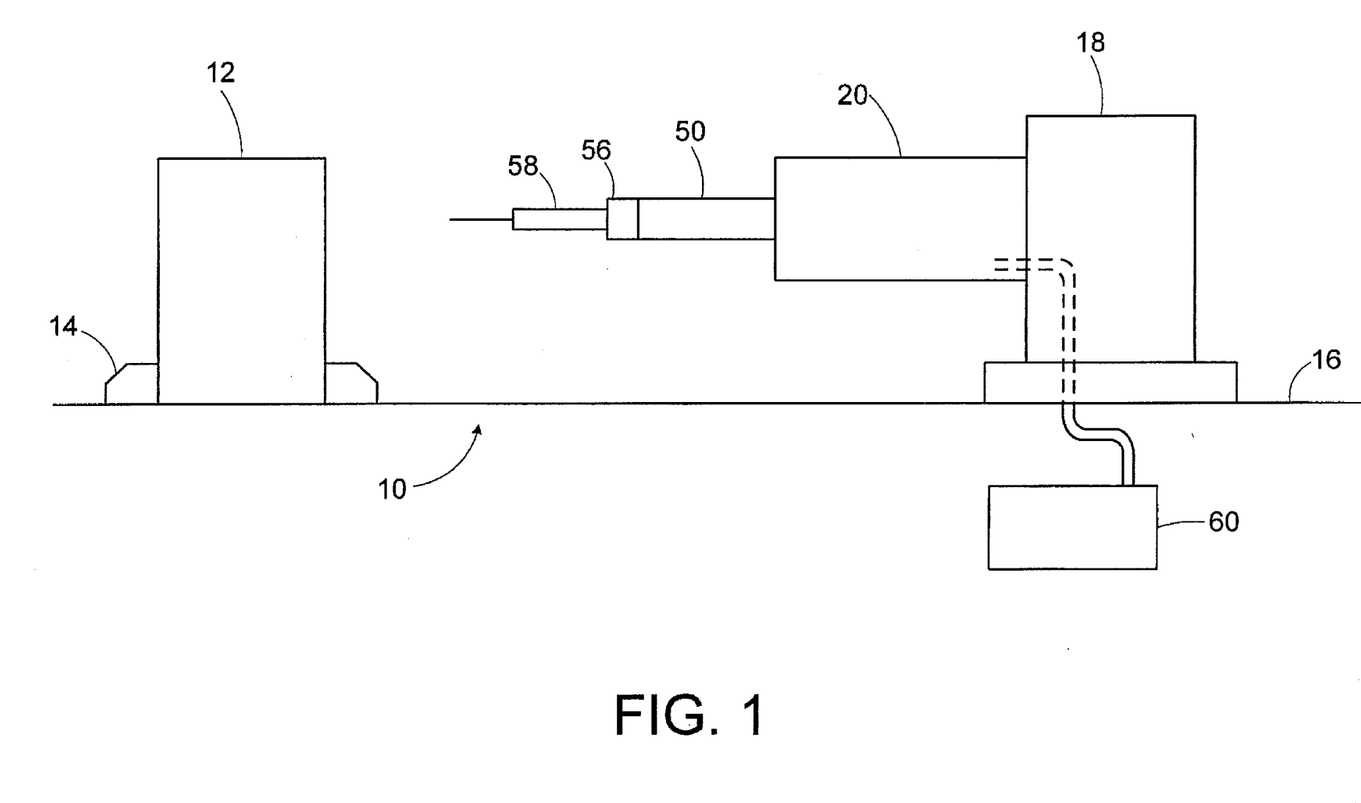
FIG. 1 shows a drilling device having a compact mechanism for creating simultaneous linear and rotary motion in accordance with one embodiment of the invention.

FIG. 1 shows a drilling machine 10 having an associated workpiece clamp 14 for holding a workpiece 12. A compact mechanism 20 capable of producing simultaneous linear and rotary motion is mounted to the machine bed 16. As shown, the compact mechanism 20 includes a drive shaft 50 with a tool chuck 56 mounted on one end thereof. The tool chuck 56 rigidly couples the drive shaft 50 to a drilling tool 58.

The compact mechanism 20 can be mounted to the tool support 18 of the drilling machine 10 by a mounting flange (not shown) for feeding and retracting the tool 58 at precisely controlled rotational speeds and feed rates. The compact mechanism 20 includes a control unit 60 for controlling the approach and retract feed rates, the rotational speed of the tool 58, and the cutting feed rate. In the preferred embodiment, the tool 58 approaches and retracts from the workpiece at the highest possible feed rate. The cutting feed rate and rotational speed is determined by the characteristics of the cutting tool 58 (i.e. tool material, cutting edge geometry) and the workpiece material as is commonly known in the art to provide optimum cutting speed and minimum tool wear.

Figure 2:
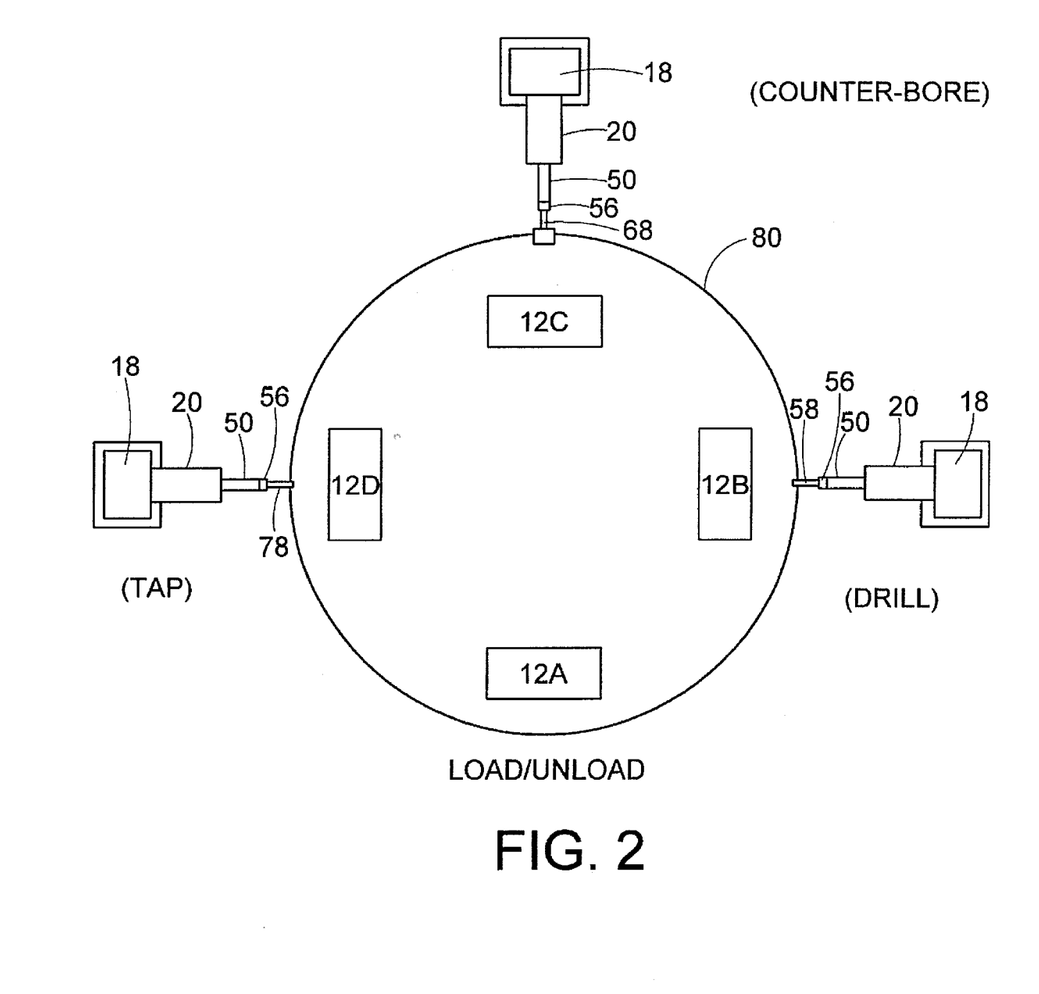
FIG. 2 shows a machining center having several turning tools arranged around a rotary table, each includes a compact mechanism for creating simultaneous linear and rotary motion in accordance with one embodiment on the present invention.

FIG. 2 shows a machining center including 4 stations A, B, C and D arranged around a rotary indexing table 80. Station A is a load/unload station where parts 12A, 12B, 12C, 12D are securely fastened to the rotary table 80, such as by a magnetic chuck or mechanical vise (not shown). Station B includes a drilling machine which performs a first operation on part 12B, for example tap drilling a hole to be threaded in a later operation. Station C includes a drilling machine which performs a second operation on part 12C, for example drilling a counterbore. Station D includes a drilling machine which performs a third operation on part 12D, for example tapping the hole drilled at station B.

Each station B, C, D utilizes the same drilling machine which comprises a compact mechanism 20 capable of producing simultaneous linear and rotary motion mounted on a tool support 18. The only difference is cutting tool 58, 68, 78 mounted in the chuck 56 and speed and feed rates that are programmed for each tool by the controller (not shown).

Using a plurality of these drilling machines provides several unique advantages. The devices are completely interchangeable. Many of these devices can be arranged in different configurations to perform a wide range of operations. The devices are not limited to drilling operations, they can be used to assemble components and drive threaded fasteners as well. The devices can also be used as the fundamental component in a multi-purpose reconfigurable automated machining and assembly system.

Figure 3:
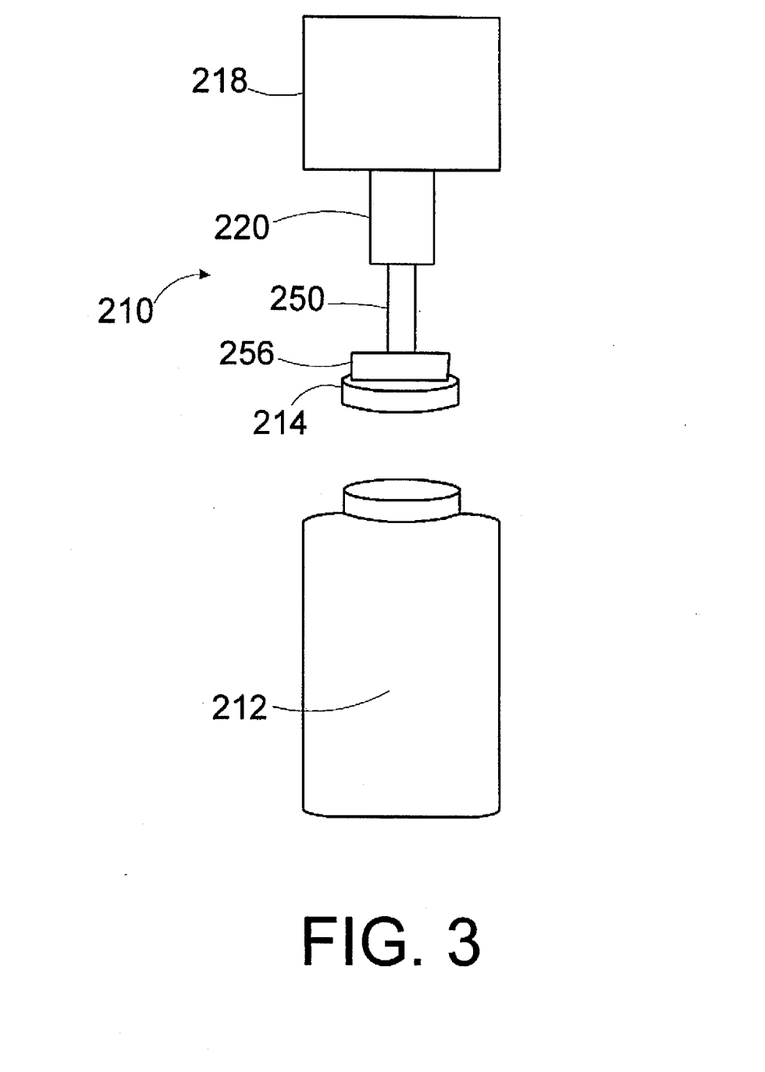
FIG. 3 shows an alternate embodiment of a compact mechanism according to the present invention in the form of an apparatus for screwing the lid onto a jar

As shown in FIG. 3, the device 210 can be utilized to perform other functions in addition to drilling, such as assembly operations. In the example shown, the device 210 is utilized to screw the cover 214 on to a jar 212. The device 210 includes the same compact mechanism 220 for producing simultaneous linear and rotary motion but the drive shaft 250 is be fitted with gripping device 256, such as one that clamps or releases upon the rotary motion of the shaft 250. The device 210 can securely mounted to a housing or tool support 218.

Figure 4:
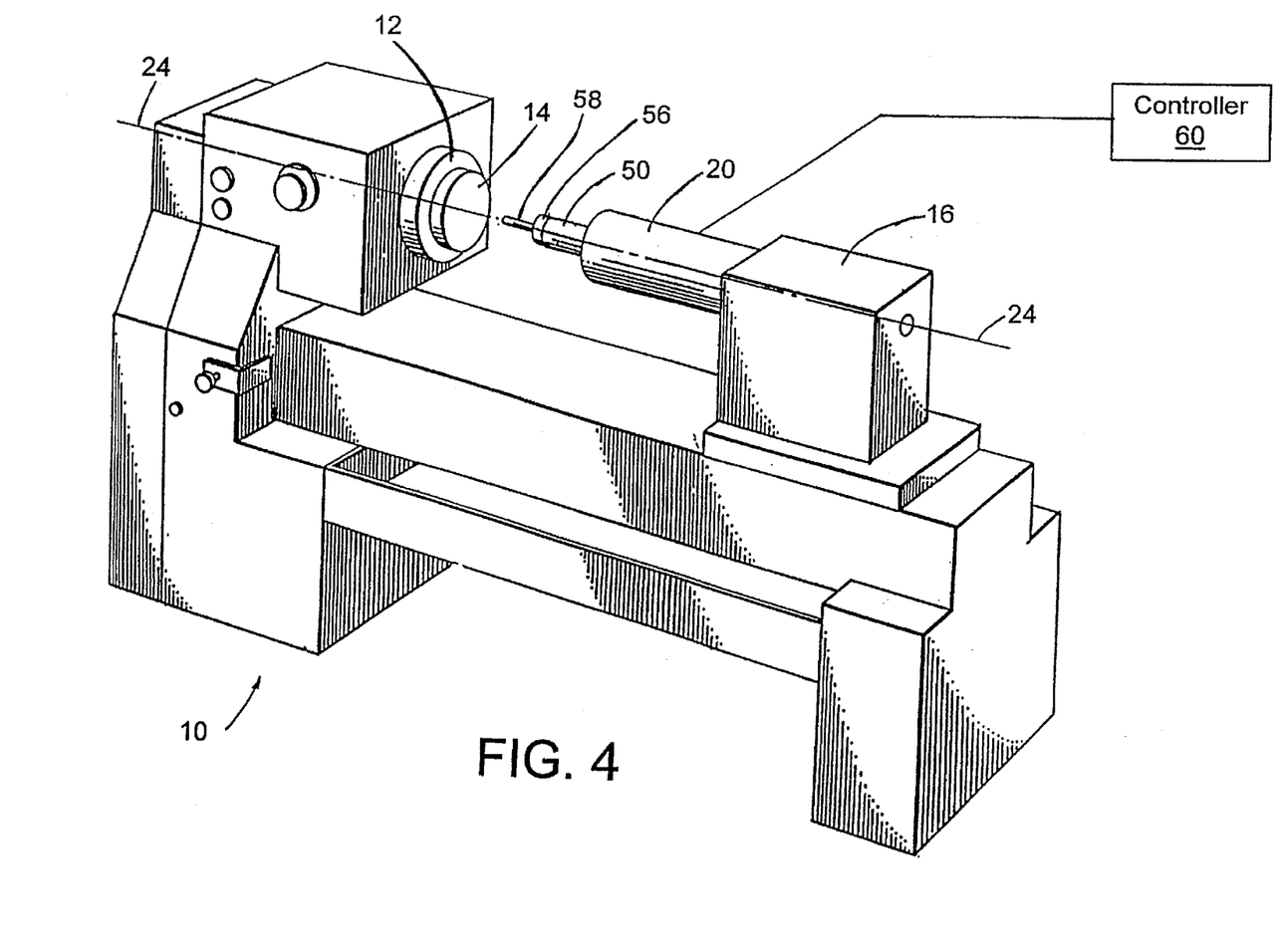
FIG. 4 shows a lathe having a compact mechanism for creating simultaneous linear and rotary motion in accordance with one embodiment of the invention.

FIG. 4 shows a lathe 10 having a workpiece spindle 12 and associated workpiece chuck 14 for holding a workpiece (not shown). In a manner similar to FIG. 1, a compact mechanism 20 capable of producing simultaneous linear and rotary motion is mounted to a tail stock 16. The compact mechanism 20 includes a drive shaft 50 with a tool chuck 56 mounted on one end thereof. The drive shaft 50 and spindle 12 are driven to rotate coaxially about a reference axis 26.

Figure 5:
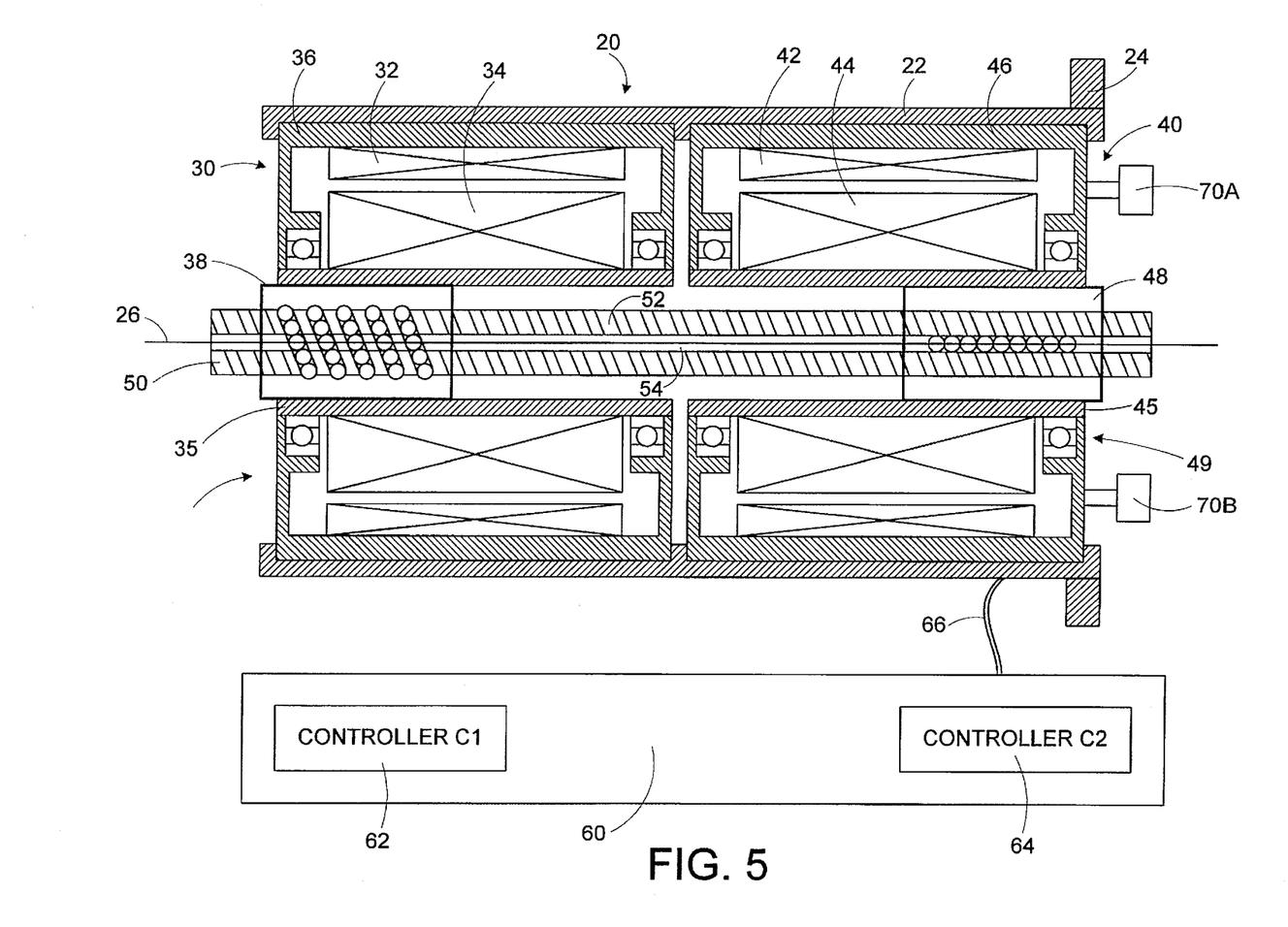
FIG. 5 is a diagrammatic cross-sectional view of a compact mechanism of FIG. 1 in accordance with one embodiment of the invention.

FIG. 5 shows one embodiment of the compact mechanism 20 in accordance with the present invention. The compact mechanism 20 can be contained in a housing 22 which includes mounting flange 24 for mounting the device on a tool support or tail stock (not shown). The compact mechanism 20 includes a first motor 30 and a second motor 40, each having a motor housing 36, 46 mounted in the housing 22. In the preferred embodiment, the motors are mounted as close together as possible in order to make the device as compact as possible.

The first motor 30 includes a stator 32 fastened to the first motor housing 36 and a rotor 34 mounted on a first hollow tubular shaft 35 for rotation with respect to the first motor housing 36 by bearings 39. The first motor 30 also includes a threaded nut or ball screw 38 coupled to the first hollow tubular shaft 35 and the rotor 34. The ball screw 38 engages a thread or helical race 52 on drive shaft 50 and converts the rotary motion of rotor 34 to linear motion that is imparted on the drive shaft 50. Thus, the first motor 30 controls, in part, the feed rate of the drive shaft 50.

The second motor 40 includes a stator 42 fastened to the second motor housing 46 and a rotor 44 mounted on a second hollow tubular shaft 45 for rotation with respect to the second motor housing 46 by bearings 49. The second motor also includes a spline nut or ball spline 48 coupled to the second hollow tubular shaft 45 and the rotor 44. The ball spline 48 engages a linear race or spline 54 on drive shaft 50 and transmits the rotary motion of rotor 44 to drive shaft 50 directly, while permitting the drive shaft 50 to move linearly along axis 26.

The output shaft 50 includes both a helical race 52 and a linear or spline race 54. As shown in FIG. 5, the helical race 52 and the linear race 54 are coextensive along the output shaft 50. This permits substantially the entire length of the output shaft 50 to be extended and retracted and permits more linear travel per unit length of the device.

The feed rate or linear speed, L, of the drive shaft 50 is given by the function:

$$L = (SP1 - SP2) \times P$$

where:

L is the linear motion in inches per minute,

SP1 is the rotational speed of the first motor 30 in revolutions per minute (rpm), SP2 is the rotational speed of the second motor 40 in revolutions per minute (rpm), and P is the pitch of the ball screw 38 in inches per revolution (ipr). Thus, if the rotation speed of the first motor 30 is 4000 rpm and the rotational speed of the second motor 40 is 2000 rpm in the same direction and pitch is 10 threads per inch (0.1 ipr), the feed rate is 200 inches per minute.

In operation, the relative speeds of the motors is controlled by control unit 60 to obtain the desired feed rate and rotational speed. By operating the motors in opposite directions extremely high approach rates are obtained. When both motors are operated at the same speed and direction, no feed of the output shaft 50 is obtained. The rotational speed of the output shaft 50 is the same as the rotational speed of the second motor 40 because they are directly coupled.

The control unit 60 includes a first controller 62 for controlling the first motor 30 and a second controller 64 for controlling the second motor 40. Power and control signals are transmitted between the control unit 60 and the compact mechanism 20 through control cable 66. The compact mechanism 20 can also include sensors 70A, 70B for detecting the end of the output shaft 50. The sensors include an emitter 70A and a detector 70B positioned on opposite sides of the output shaft 50. The sensors 70A, 70B produce a signal indicating that the end of the drive shaft is detected and transmit that signal to the control unit 60. The control unit 60 utilizes that signal to determine when to stop the output shaft 50 in order to prevent it from traveling off the ball spline 48 or ball screw 38. The sensors 70A, 70B can also be utilized to home the drive shaft 50 and establish a reference position when the system is initialized.

Figure 6:
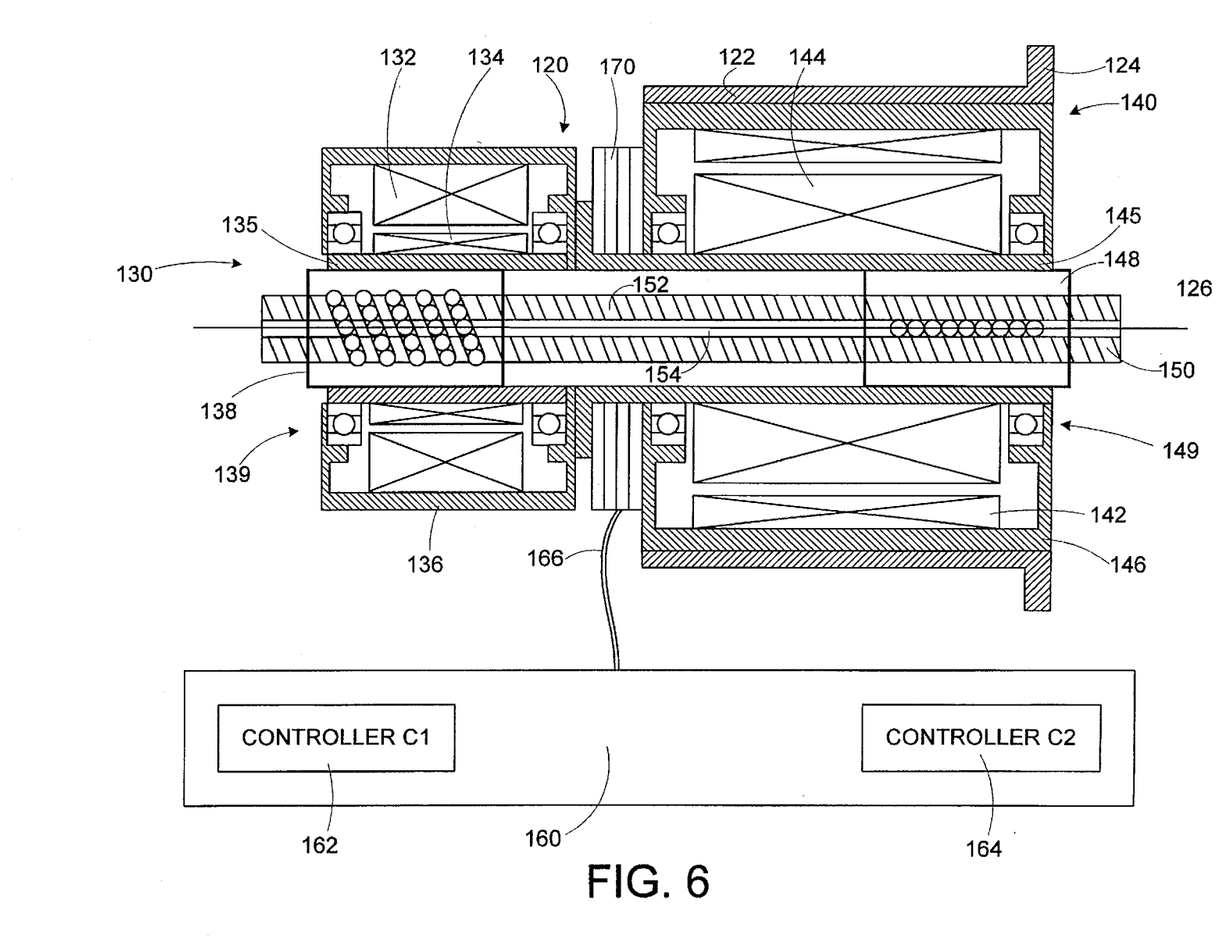
FIG. 6 is a diagrammatic cross-sectional view of a compact device in accordance with another embodiment of the invention.

FIG. 6 shows an alternate embodiment of the compact mechanism 120 in accordance with the present invention. The compact mechanism 120 includes a housing 122 having a mounting flange 124 for mounting the device on a tool support. The compact mechanism 120 includes a first motor 130 and a second motor 140, each having a motor housing 136, 146. In the preferred embodiment, the motors are mounted as close together as possible in order to make the device as compact as possible.

The first motor 130 includes a stator 132 fastened to the motor housing 136 and a rotor 134 mounted on a first hollow tubular shaft 135 for rotation with respect to the motor housing 136 by bearings 139. The motor housing 136 is coupled to the rotor 144 of second motor 140 of the compact mechanism 120 as will be described below. The first motor 130 also includes a threaded nut or ball screw 138 coupled to the first hollow tubular shaft 135 and the rotor 134. The ball screw 138 engages a thread or helical race 152 on the drive shaft 150 and converts the rotary motion of rotor 134 to linear motion that is imparted on the drive shaft 150. Thus, the first motor 130 controls the feed rate of the drive shaft 150.

The second motor 140 includes a stator 142 mounted to the motor housing 146 and a rotor 144 mounted on a second hollow tubular shaft 145 for rotation with respect to the motor housing 146 by bearings 149. The second motor also includes a spline nut or ball spline 148 coupled to the second hollow tubular shaft 145 and the rotor 144. The ball spline 148 engages a linear race or spline 154 on drive shaft 150 and transmits the rotary motion of rotor 144 to drive shaft 150 directly, while permitting the output shaft 150 to move linearly along axis 126.

The rotor 144 of the second motor 140 and the second tubular shaft 145 are coupled to the first motor housing 136 of the compact mechanism 120 and imparts rotary motion to the first motor 130. This is the major difference between the embodiment of FIG. 5 and the embodiment of FIG. 6. In this configuration, the linear motion of the output shaft 150 is controlled entirely by the first motor 130 and is not affected by the rotational speed of the second motor 140.

Like the output shaft 50 shown in FIG. 5, the output shaft 150 includes both a helical race 152 and a linear or spline race 154. Similarly, as shown in FIG. 5, the helical race 152 and the linear race 154 are coextensive along the output shaft 150. This permits substantially the entire length of the output shaft 150 to be extended and retracted.

For the alternative embodiment, the feed rate or linear speed, L, of the drive shaft 150 is given by the function:

$$L = SP1 \times P$$

where:

L is the linear motion in inches per minute,

SP1 is the rotational speed of the first motor 30 in revolutions per minute (rpm), and P is the pitch of the ball screw 138 in inches per revolution (ipr). Thus, if the rotation speed of the first motor 130 is 4000 rpm and the pitch is 10 treads per inch (0.1 ipr), the feed rate is 400 inches per minute.

In this embodiment, the first motor 130 is rotated by the second motor 140, consequently slip rings or similar couplings 170 are necessary to transmit the power and control signals between the first motor 130 and the control unit 160. The control unit 160 includes a first controller 162 for controlling the first motor 130 and a second controller 164 for controlling the second motor 140. Power and control signals are transmitted between the control unit 160 and the compact mechanism 120 through control cable 166.

In either embodiment, the motors can be servomotors or stepping motors that are electrically, hydraulically or pneumatically driven. Consequently, the terms rotor and stator, as used herein, are intended to include those components of an electric motor as well as the equivalent and analogous components of nonelectric motors.

In the preferred embodiment, the first motor is a stepping motor and second motor is a servomotor. It is also preferable that the motors be "pancake" type motors which have a short axial length to provide for a more compact mechanism. While the illustrative embodiments show the motors in an coaxial configuration, one or both of the motors may be offset from the rotational axis of the drive shaft. Belts or gears and the like can be utilized to transmit the rotary motion to the drive shaft.

In an alternate embodiment, the cross-section of the drive shaft 50 can be made triangular instead of being provided with a spline. In this embodiment, the spline nut or ball spline 48 is replaced with a robe having a complementary triangular hole which permits the drive shaft to slide axially with respect to the tube but not turn relative the tube. Optionally, the cross-section can be any polygonal shape, for example, square, rectangular, pentagonal, hexagonal, octagonal.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A rotary and linear motion drive assembly comprising:

an output shaft extending along an output axis and an associated linear transmission element and rotary transmission element, said output shaft including at least one helical race extending along at least a portion of said output shaft and adapted to engage said linear transmission element, said output shaft also including at least one linear spline race extending along at least a portion of said output shaft and adapted to engage said rotary transmission element, said at least one helical race and said at least one linear race extending coextensively along at least a portion of said output shaft, a first motor including a first stator and a first rotor adapted to rotate about said output axis, said first rotor operatively coupled to said linear transmission element and including means for moving said output shaft along said output axis in response to an applied linear motion control signal, a second motor including a second stator and a second rotor adapted to rotate about said output axis, said second rotor operatively coupled to said rotary transmission element and including means for rotating said output shaft about said output axis in response to an applied rotary motion control signal, a housing supporting said first motor and said second motor and coupling said first stator to said second stator and restraining relative motion of said first stator with respect to said second stator, control means operatively connected to said first motor and said second motor for generating said linear motion control signal and said rotary motion control signal and a chuck rigidly coupled to one end of said output shaft for coupling a tool or workpiece and for imparting linear and rotary motion to said tool or workpiece.

2. A drive assembly according to claim 1 wherein said first motor is one from the group consisting of a servomotor and a stepping motor.

3. A drive assembly according to claim 1 wherein said housing further comprises means for mounting said drive assembly to a support structure.

4. A drive assembly according to claim 1 wherein said at least one helical race and said at least one linear race extend coextensively along substantially the entire length of said output shaft.

5. A drive assembly according to claim 1 further comprising sensing means for sensing the position of one end of said output shaft with respect to one of said first motor and said second motor.

6. A drive assembly according to claim 1 wherein said second motor is one from the group consisting of a servomotor and a stepping motor.

7. A simultaneous rotary and linear motion drive assembly comprising:

A. an output shaft extending along an output axis,

B. a first motor operatively coupled to said output shaft for moving said output shaft along said output axis in response to a linear motion control signal, C. a second motor operatively coupled to said first motor for rotating said first motor with respect to said second motor about said output axis in response to a rotary motion control signal, D. control means operatively coupled to said first motor and said second motor for generating said linear motion control signal and said rotary motion control signal, wherein said second motor includes a rotor and a stator and said, stator includes mounting means for mounting said stator to means for supporting said drive assembly, and wherein said first motor includes a rotor and a stator, said rotor is operatively coupled to a first transmission means for converting rotary motion of said first motor into linear motion and transferring said linear motion to said output shaft and said stator is operatively coupled to said rotor of said second motor and being operatively coupled to a second transmission means for transferring rotary motion of said second motor to said output shaft.

8. A drive assembly according to claim 7 further comprising:

a linear transmission element operatively coupling said first motor to said output shaft, a rotary transmission element operatively coupling said second motor to said output shaft, and wherein said output shaft includes at least one helical race extending along at least a portion of said output shaft and engaging said linear transmission element for imparting linear motion to said output shaft and said output shaft also includes at least one linear spline race extending along at least a portion of said output shaft and engaging said rotary transmission element for imparting rotary motion on said output shaft.

9. A drive assembly according to claim 8 wherein said at least one helical race and said at least one linear race extend coextensively along the entire length of said output shaft.

10. A drive assembly according to claim 8 wherein:

the rotational speed of the output shaft is equal to the rotational speed (SP2) of the second motor and the linear speed of the output shaft is the product of the rotational speed (SP1) of the first motor and the pitch (TP) of the linear transmission element (SP1×TP) and the feed rate of the output shaft is given by (SP1×TP)/SP2.

11. A drive assembly according to claim 8 wherein:

said at least one helical race and said at least one linear race extend coextensively along at least a portion of said output shaft.

12. A drive assembly according to claim 7 wherein:

said output shaft includes sensor means for generating signals indicating at least one of the rotary motion of said output shaft and said linear motion of said output shaft.

13. A drive assembly according to claim 7 wherein said first motor includes a central axis substantially parallel to said output axis, and said second motor includes a central axis substantially parallel to said output axis.

14. A drive assembly according to claim 7 wherein:

said control means includes a first controller operatively coupled to said first motor for controlling the rotational motion of said first motor, and a second controller operatively coupled to said second motor for controlling the rotational motion of said second motor.

15. A drive assembly according to claim 7 wherein:

said output shaft includes a chuck adapted for carrying a tool or a workpiece.

16. A drive assembly according to claim 7 wherein said first motor includes a central axis extending along said output axis, and said second motor includes a central axis extending along said output axis.

17. A drive assembly according to claim 7 wherein said first motor includes a central axis substantially parallel to said output axis, and said second motor includes a central axis substantially parallel to said output axis.

18. A drive assembly according to claim 7 wherein said first motor includes a central axis extending along said output axis, and said second motor includes a central axis extending along said output axis.

* * * * *